United States Patent [19]
Morishima

[11] Patent Number: 6,075,998
[45] Date of Patent: *Jun. 13, 2000

[54] COMMUNICATION APPARATUS CAPABLE OF ANNOUNCING RECEPTION OF A CALL BY A MELODY SOUND COMPOSED BY A USER

[75] Inventor: Masaaki Morishima, Shizuoka, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/815,477

[22] Filed: Mar. 11, 1997

[30] Foreign Application Priority Data

Mar. 13, 1996 [JP] Japan ................................. 8-055940
Mar. 13, 1996 [JP] Japan ................................. 8-055941

[51] Int. Cl.[7] ................................................ G08B 3/00
[52] U.S. Cl. ................................... 455/567; 340/825.44
[58] Field of Search ................................... 455/31.1, 352, 455/353, 567; 341/176; 340/384.1, 311.1, 825.44; 379/373, 374, 375

[56] References Cited

U.S. PATENT DOCUMENTS

| | | | |
|---|---|---|---|
| 4,368,989 | 1/1983 | Kawashima | 368/74 |
| 4,519,044 | 5/1985 | Munetsugu | 708/134 |
| 4,646,609 | 3/1987 | Teruo et al. | 84/615 |
| 5,739,759 | 4/1998 | Nakazawa et al. | 340/825.44 |
| 5,757,277 | 5/1998 | Kobayashi | 340/825.22 |
| 5,802,467 | 9/1998 | Salazar et al. | 455/420 |

FOREIGN PATENT DOCUMENTS

| | | | |
|---|---|---|---|
| 0684591A1 | 5/1995 | European Pat. Off. | G08B 3/10 |
| 756252 | 1/1997 | European Pat. Off. | G08B 3/10 |
| 63-292736 | 11/1988 | Japan . | |
| 2-27821 | 1/1990 | Japan . | |
| 05347576 | 12/1993 | Japan . | |
| 6-107337 | 5/1994 | Japan | H04Q 7/14 |
| 07222226 | 8/1995 | Japan . | |
| WO 96/06417 | 2/1996 | WIPO . | |

OTHER PUBLICATIONS

Breeden, R.L., "Meaningful, Tuneful Pager Alert", Motorola Technical Developments vol. 19, Jun. 1, 1993.

*Primary Examiner*—Dwayne D. Bost
*Assistant Examiner*—Sonny Trinh
*Attorney, Agent, or Firm*—Scully, Scott, Murphy & Presser

[57] ABSTRACT

In a communication apparatus which announces reception of a call by a melody sound, a memory preliminarily memorizes musical tone information data representing tone names of a number of musical tones and tone name frequencies of the tone names, respectively, and preliminarily memorizes musical note information data representing a number of musical notes and time values of the number of musical notes, respectively. The apparatus includes a radio signal processing part for receiving and processing a radio signal sent by a caller which includes a sequence of information pairs, each information pair including one of the number of musical tone information data and one of the number of musical note information data. A producing part produces a musical tone pattern signal having a sequence of frequency-time value pairs by reading, from memory, each frequency-time value pair. The musical tone pattern signal is for use in deciding the melody in response to a recognized call.

7 Claims, 15 Drawing Sheets

| X \ Y | 0 | 1 | 2 | 3 | 4 | 5 | 6 | 7 |
|---|---|---|---|---|---|---|---|---|
| 0 (do) 1038Hz | ♬ | ♩ | ♩. | ♩ | ♬ | ♩˙ | ♩: | 𝅝 |
| 1 (re) 1164Hz | ♬ | ♩ | ♩. | ♩ | ♬ | ♩˙ | ♩: | 𝅝 |
| 2 (mi) 1280Hz | ♬ | ♩ | ♩. | ♩ | ♬ | ♩˙ | ♩: | 𝅝 |
| 3 (fa) 1371Hz | ♬ | ♩ | ♩. | ♩ | ♬ | ♩˙ | ♩: | 𝅝 |
| 4 (sol) 1536Hz | ♬ | ♩ | ♩. | ♩ | ♬ | ♩˙ | ♩: | 𝅝 |
| 5 (la) 1745Hz | ♬ | ♩ | ♩. | ♩ | ♬ | ♩˙ | ♩: | 𝅝 |
| 6 (si) 1920Hz | ♬ | ♩ | ♩. | ♩ | ♬ | ♩˙ | ♩: | 𝅝 |
| 7 (do) 2076Hz | ♬ | ♩ | ♩. | ♩ | ♬ | ♩˙ | ♩: | 𝅝 |

FIG. 3

COMMUNICATION APPARATUS CAPABLE OF ANNOUNCING RECEPTION OF A CALL BY A MELODY SOUND COMPOSED BY A USER

BACKGROUND OF THE INVENTION

This invention relates to a communication apparatus for announcing reception of a call by a sound. The communication apparatus may be a radio communication apparatus of, for example, a radio paging receiver, a transceiver, or the like although description will mainly made in connection with the radio paging receiver.

Recently, a radio paging receiver of the type described is proposed which can carry out a call announcement for announcing reception of a call destined to the receiver by a melody sound instead of a beep sound.

A conventional radio paging receiver which will later described, has a structure in which the call announcement is carried out by a melody of a single fixed melody pattern. It is impossible to suit the taste of a user of the radio paging receiver.

Another radio paging receiver disclosed in Japanese Unexamined Patent Publication No. 27821/1990 has a structure capable of selecting from several kinds of melody patterns a selected melody specified by message information (or a message code) which is produced by a user of a counterpart and which is included in a radio signal destined to the receiver. Although the call announcement can be carried out in this radio paging receiver by the use of the melody sound selected from a plurality of kinds of melody patterns, selection is restricted among those melody patterns preliminarily memorized in the receiver. It is therefore impossible to suit the taste of not only the user of the radio paging receiver but also the user of the counterpart.

SUMMARY OF THE INVENTION

It is therefore an object of this invention to provide a communication apparatus which can carry out a call announcement for announcing reception of a call by a melody sound freely composed by a user.

It is another object of this invention to provide a communication apparatus of the type described, which can carry out the call announcement by the melody sound freely composed by a user of a counterpart.

It is still another object of this invention to provide a communication apparatus of the type described, which can carry out the call announcement by the melody sound freely composed by a user of the communication apparatus.

A communication apparatus to which this invention is applicable carries out a call announcement for announcing reception of a call by a melody sound.

According to this invention, the communication apparatus comprises: musical tone information memorizing means for preliminarily memorizing a plurality of musical tone information data representing tone names of a plurality of musical tones and tone name frequencies of the tone names of the plurality of musical tones, respectively, and for preliminarily memorizing a plurality of musical note information data representing a plurality of musical notes and time values of the plurality of musical notes, respectively; processing means supplied with an electromagnetic wave carrying a specifying signal which specifies a sequence of information pairs, each information pair comprising one of the plurality of musical tone information data and one of the plurality of musical note information data, the processing means processing the electromagnetic wave into the specifying signal; and producing means connected to the musical tone information memorizing means and the processing means for producing a musical tone pattern signal comprising a sequence of frequency-time value pairs by reading, from the musical tone information memorizing means, each frequency-time value pair comprising one of the tone name frequencies and one of the time values in response to each information pair specified by the specifying signal. The musical tone pattern signal is for use in deciding the melody sound on generation of the melody sound.

Preferably, the electromagnetic wave carrying the specifying signal is a radio signal carrying the specifying signal. Alternatively, the electromagnetic wave carrying the specifying signal may be an infrared signal carrying the specifying signal.

BRIEF DESCRIPTION OF THE DRAWING

FIG. 3 is a diagram for use in describing a structure of a scale map ROM (namely, a musical tone information memory) of the radio paging receiver illustrated in FIG. 2;

DESCRIPTION OF THE PREFERRED EMBODIMENTS

Figure 1:
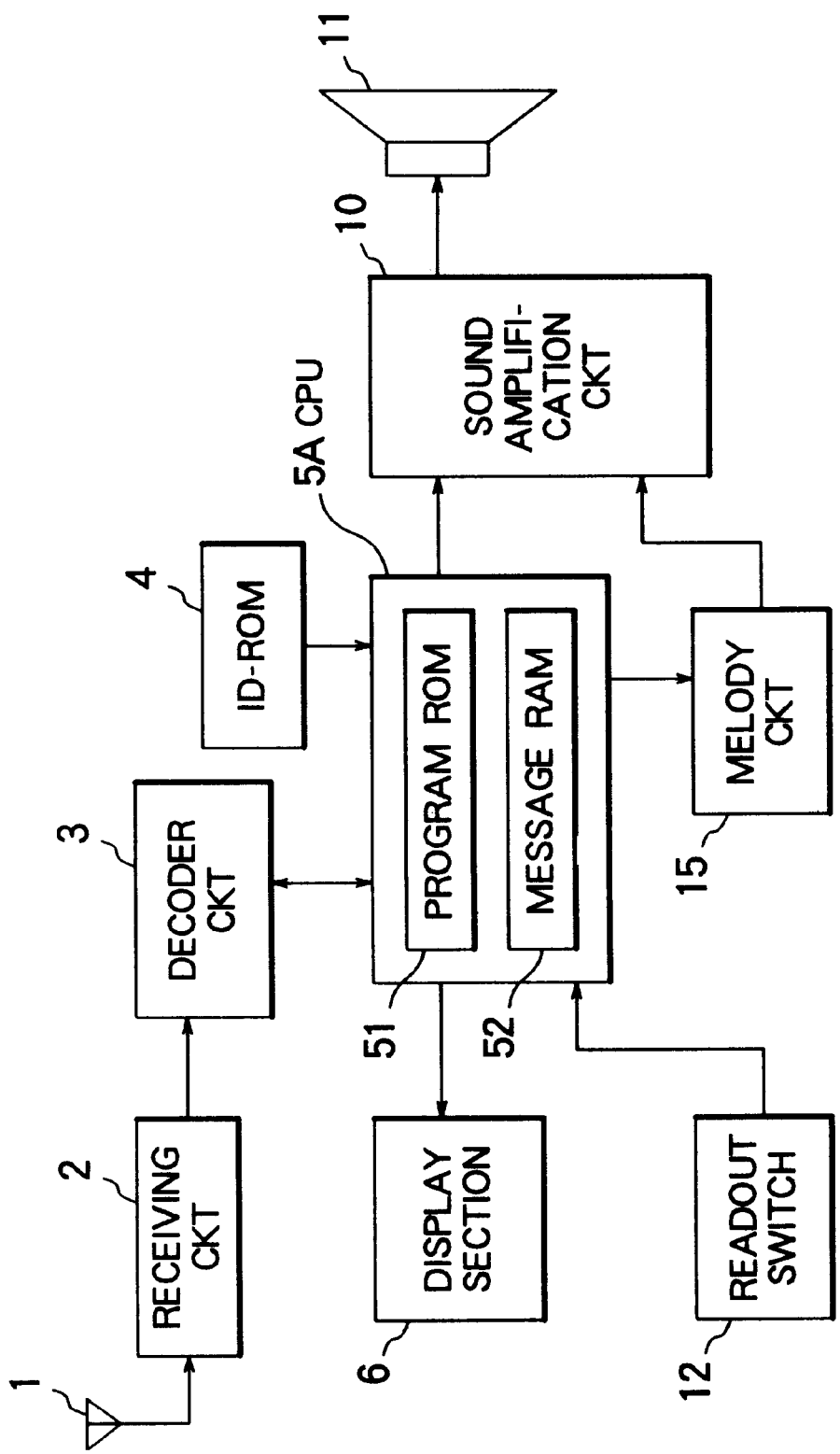
FIG. 1 is a block diagram of a conventional radio paging receiver.

Referring to FIG. 1, a conventional radio paging receiver will first be described for a better understanding of this invention. The radio paging receiver is equivalent to the conventional radio paging receiver described in the preamble of the instant specification.

In the radio paging receiver, a receiving circuit 2 receives and demodulates an ordinary radio signal through an antenna 1 from a base station (not shown) of a paging system including the radio paging receiver. A demodulated signal produced by the receiving circuit 2 is subjected to signal processing in a decoder circuit 3. That is, the decoder circuit 3 decodes the demodulated signal into a decoded signal. An ID-ROM (read-only memory) 4 preliminarily memorizes specific ID (identification) numbers representative of specific call numbers assigned to the receiver, an address of each ID number, and so on. Such memorized information is preliminarily sent through a CPU (central processing unit) 5A to the decoder circuit 3. The decoder circuit 3 collates with the specific ID numbers a call number contained in the signal (that is, the decoded signal) subjected to the signal processing. Upon coincidence therebetween, the decoder circuit 3 causes a reception interruption in the CPU 5A and delivers message information (or a message code) which represents message and which succeeds the call number in the decoded signal. Being subjected to the reception interruption, the CPU 5A makes a message represented by the message information be stored in a message RAM (random access memory) 52 and displayed in a display section 6 comprising an LCD (liquid crystal display) unit. In addition, the CPU 5A makes, through a sound amplification circuit 10, a loudspeaker 11 generate a sound such as a beep sound to carry out a call announcement for announcing reception of a call. A program ROM 51 is a ROM storing a program for operating the CPU 5A and sound data such as the beep sound. The message information is kept memorized in the message RAM 52 in the CPU 5A after the call announcement. When the CPU 5A is subjected to a message display interruption by manipulation of a readout switch 12, the CPU 5A successively retrieves those messages from the message RAM 52 for display in the display section 6.

The above-mentioned radio paging receiver can carry out the call announcement not only by the beep sound but also by a melody sound so as to suit the taste and the convenience of a user. In case where it is selected to carry out the call announcement by the melody sound, the CPU 5A delivers, upon reception of a call, a melody play instruction to a melody circuit 15. A melody is read from the melody circuit 15 and delivered through the sound amplification circuit 10 to the loudspeaker 11 to be generated as the melody sound. The melody circuit 15 may be contained in the CPU 5A or the decoder circuit 3.

Figure 2:
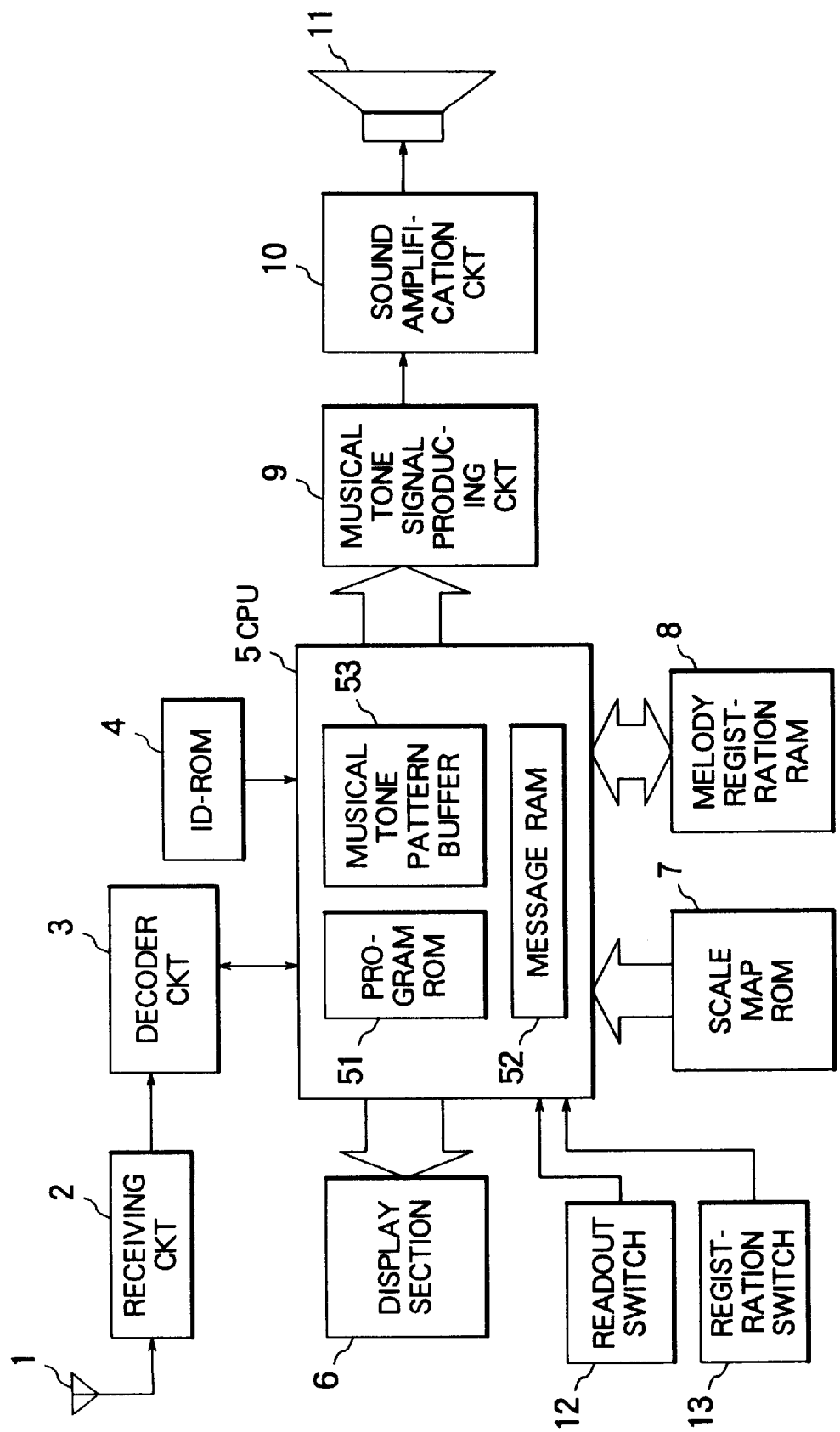
FIG. 2 is a block diagram of a radio paging receiver according to a first embodiment of this invention.

Turning to FIG. 2, a radio paging receiver according to a first embodiment of this invention comprises similar parts designated by like reference numerals. That is, in the radio paging receiver, an antenna 1, a receiving circuit 2, a decoder circuit 3, an ID-ROM 4, a display section 6, a sound amplification circuit 10, a loudspeaker 11, and a readout switch 12 have functions similar to those of the radio paging receiver shown in FIG. 1.

A scale map ROM (namely, a musical tone information memory) 7 stores, in the form of a map, information of a plurality of musical tones forming a scale. Specifically, the scale map ROM 7 preliminarily memorizes a plurality of musical tone information data each of which is composed of tone name information comprising a tone name (or pitch name) of each musical tone and a tone (or pitch) name frequency or an oscillation frequency of the tone name, and a plurality of musical note information data which are composed of musical note information representing a plurality of musical notes and sound generation times (time values) of the musical notes for each tone name. The ID-ROM 4 also memorizes an identification symbol indicating that melody data are included in message information of a radio signal received by this paging receiver. As the identification symbol, use can be made of numerals, characters, and symbols. In this embodiment, a symbol ]] is used as the identification symbol. The identification symbol ]] may be memorized in a memory circuit, such as a program ROM 51, which the CPU 5 has.

The CPU 5 receives from the decoder circuit 3 the message information obtained by processing the above-mentioned radio signal which carries the message information. When the identification symbol ]] is recognized in the message information with reference to the identification symbol ]] memorized in the ID-ROM 4, the CPU converts the message information following the identification symbol ]] and comprising numeral-string or character-string data into the musical tone information comprising the tone name information and the musical note information. The CPU 5 time-sequentially develops the musical tone information with reference to the scale map ROM 7 to prepare the melody data. The CPU 5 makes the melody data be displayed in the display section 6. Furthermore, the CPU 5 processes the melody data into a musical tone pattern to be stored in a musical tone pattern buffer 53, by converting the tone name information and the musical note information into tone name frequency information and sound generation time information, respectively.

The CPU 5 delivers to a musical tone signal producing circuit 9 the musical tone pattern stored in the musical tone pattern buffer 53. The musical tone signal producing circuit 9 converts the musical tone pattern into a musical tone signal representative of the tone name frequencies and the sound generation times successively corresponding to the musical tones, in other words, produces a melody signal. The sound amplification circuit 10 amplifies the melody signal and the loudspeaker 11 generates a melody sound corresponding to the melody signal.

The paging receiver can memorize the melody data thus produced so as to generate the melody sound corresponding to the melody data in call announcement on next and subsequent occasions. Specifically, when a registration switch 13 is manipulated to register the melody data which have been produced, the CPU 5 makes the musical tone pattern developed at the musical tone pattern buffer 53 be registered in a melody registration RAM 8. In case where the musical tone pattern is memorized in this RAM 8, the CPU 5 reads, in announcing reception on next and subsequent occasions, the musical tone pattern from the RAM 8 for supply to the musical tone pattern buffer 53 to play a melody. The melody registration RAM 8 may be implemented by an erasable/programmable EEPROM.

In this paging receiver also, the program ROM 51 further stores a program for operating the CPU 5, like in the conventional receiver. The message information except a part for the melody announcement is memorized in a message RAM 52 in the CPU 5. When the CPU 5 is subjected to a message display interruption by manipulation of the readout switch 12, the CPU 5 successively retrieves those messages from the message RAM 52 for display in the display section 6.

As described above, the paging receiver according to this embodiment can use, for the call announcement, a melody prepared by the radio signal received from a base station, namely, prepared by an air interface. Therefore, the call announcement can be carried out by the melody produced in conformity with the taste of each of a large number of users.

Turning to FIG. 3, a structure of the scale map ROM (namely, the musical tone information memory) of FIG. 2 is illustrated.

In the scale map ROM 7, X rows consisting of zeroth through seventh rows are allocated with the tone name information comprising the tone names and the tone name frequencies in the order on the scale while Y columns consisting of zeroth through seventh columns are allocated with the musical note information. Thus, the musical tone information is allocated in the form of the scale map to the X rows and the Y columns. The zeroth through the seventh addresses of the X rows are allocated with a tone name (do) of a tone name frequency of 1038 Hz through an octave tone name (do) of a tone name frequency of 2076 Hz, respectively. Although these tone name frequencies are specified on the scale of a key C, use may be made of different tone name frequencies on the scale of any other keynote desired by the user.

The zeroth through the seventh addresses of the Y columns are allocated with the musical note information in the order from a shorter time duration, namely, in the order of ♪ (sixteenth note), ♪ (eighth note), ♪. (dotted eighth note), ♩ (quarter note), ♩♪ (quarter note tied with sixteenth note), ♩. (dotted quarter note), ♩.. (double-dotted quarter note), and ♩ (half note), respectively.

Figure 4:
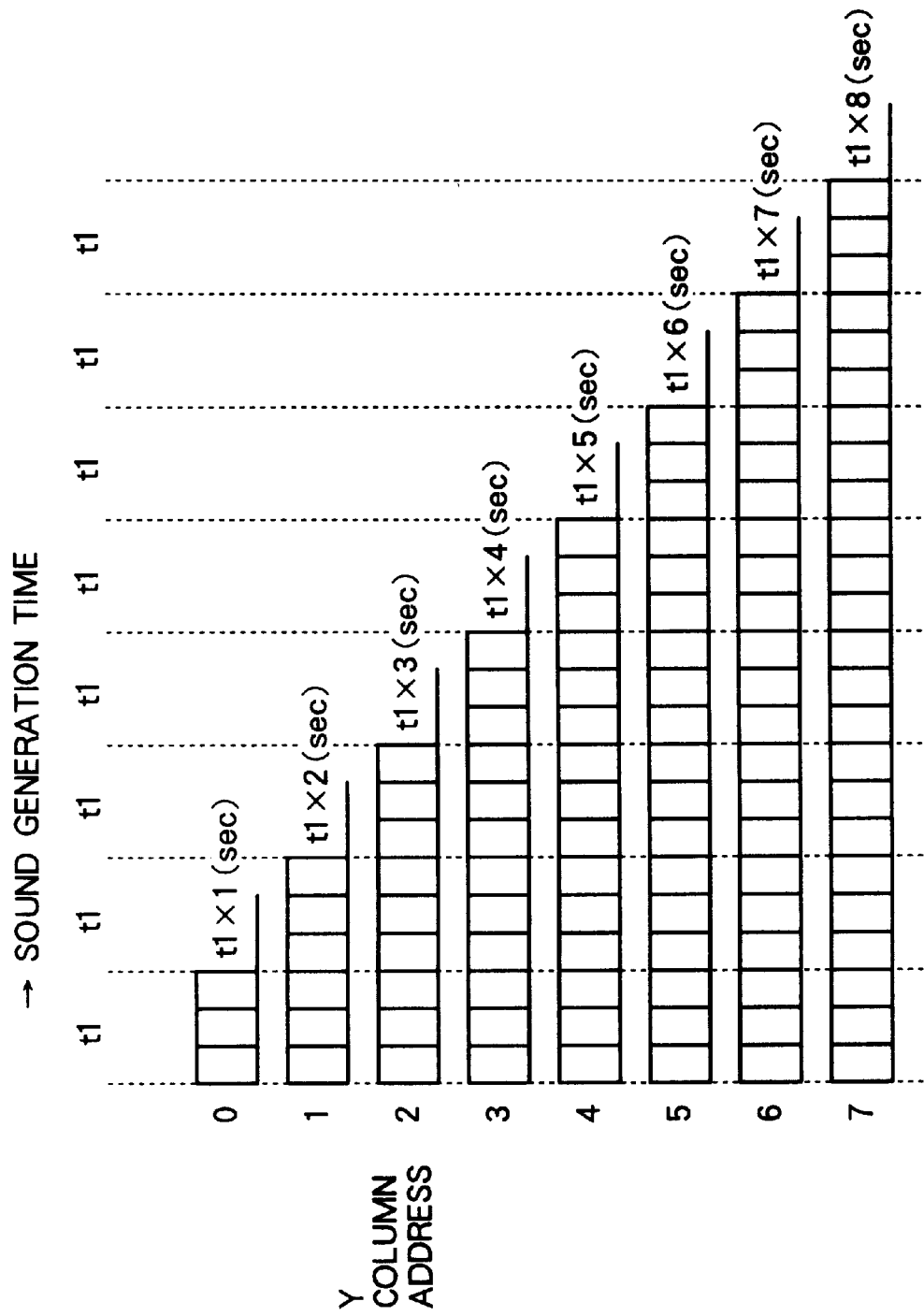
FIG. 4 is a view for use in describing a time value (namely, a sound generation time) of each of musical notes memorized in the scale map ROM illustrated in FIG. 3.

FIG. 4 is a view for describing the time values of the musical note information of the musical tone information stored in the scale map ROM 7, in other words, the sound generation times of the loudspeaker 11 for the respective musical notes.

The zeroth address of the Y columns in the scale map ROM 7 is allocated with the musical note ♪ (sixteenth note). When the musical tone information contains the musical note information representative of this musical note ♪, the sound generation time is equal to a basic sound generation time of t1 seconds. Likewise, the musical note ♪ at the first address, the musical note ♪. at the second address, the musical note ♩ at the third address, the musical note ♩♪ at the fourth address, the musical note ♩. at the fifth address, the musical note ♩.. at the sixth address, and the musical note ♩ at the seventh address have sound generation times of (t1×2) seconds, (t1×3) seconds, (t2×4) seconds, (t2×5) seconds, (t2×6) seconds, (t1×7) seconds, and (t1×8) seconds, respectively. It is noted here that the time t1 differs in dependence upon the rate of the melody, namely, the "tempo" such as adagio and andante.

Figure 5:
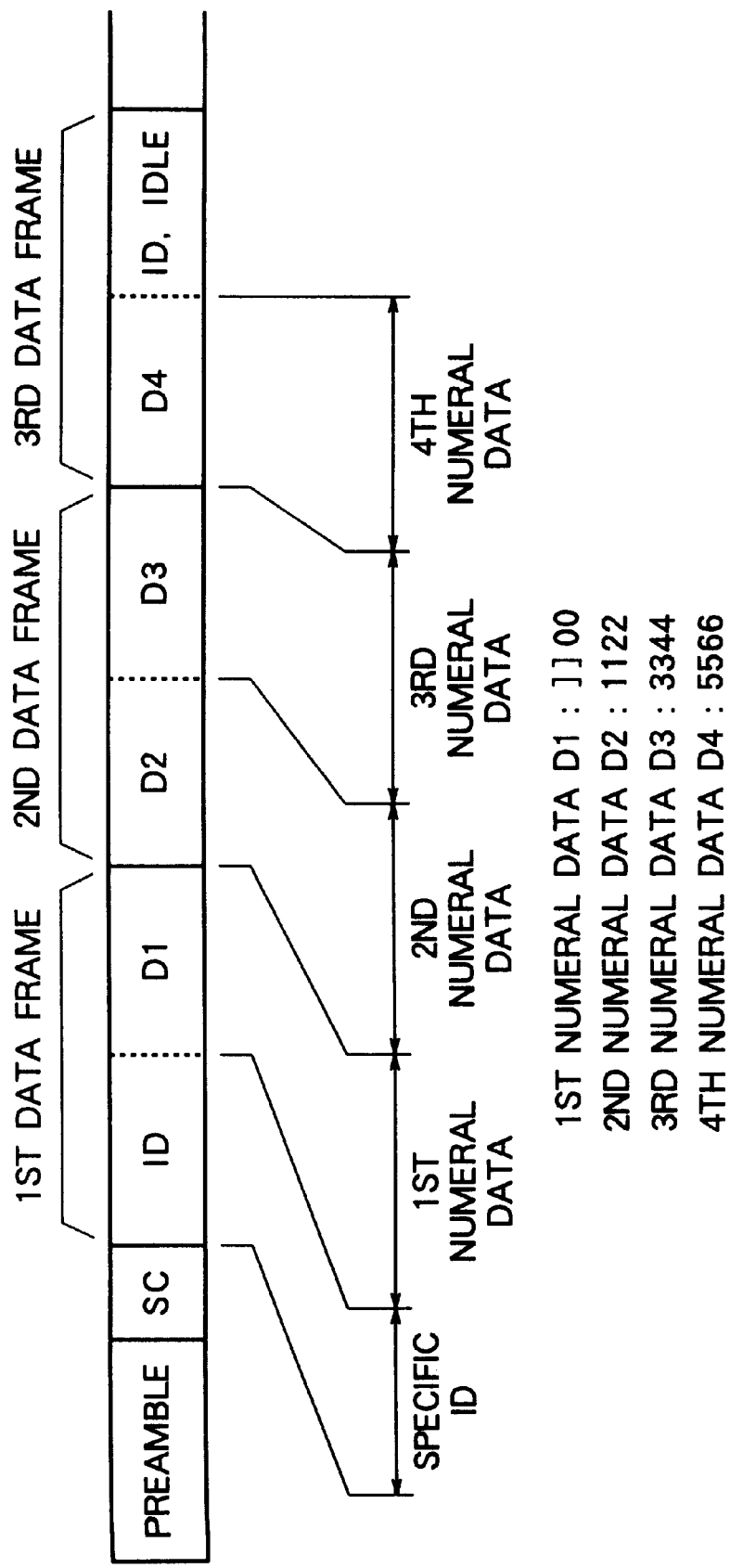
FIG. 5 is a signal format of a radio signal for use in describing operation of the radio paging receiver illustrated in FIG. 2.

FIG. 5 shows an example of a signal format of the radio signal received by the paging receiver.

This radio signal is well known as a POCSAG signal. The radio signal comprises a preamble signal, a synchronization code (SC), and three data frames as first through third data frames. Each of the data frames has two code words each comprising four bits. The first data frame has a first-half code word representative of a specific identification number (ID) of the paging receiver and a latter-half code word D1 representative of numeral data comprising four bits. The second data frame through a first-half code word of the third data frame are occupied with a succession of second through fourth numeral data D2 through D4. In the manner which will become clear as the description proceeds, the second through fourth numeral data D2 through D4 are collectively as a specifying signal which specifies a sequence of information pairs, each information pair comprising one of the musical tone information data and one of the musical note information data. A latter-half code word in the third data frame is occupied with another ID or an idle code word (IDLE). Thus, reception data related to the specific ID of the paging receiver are terminated by reception of a latter-half code word in the third data frame. The data from the first numeral data D1 to the fourth numeral data D4 may be called the message information.

In the radio signal illustrated in FIG. 5, the numeral data D1 through D4 comprise four-bit signals "]]00", "1122", "2233", "3344", and "5566", respectively. When the CPU 5 recognizes ]]in the numeral data D1 of the message information supplied from the decoder circuit 3, the CPU 5 recognizes that the identification symbol ]] for the melody announcement has been received. Next, the CPU 5 recognizes the numeral data D2 through D4 "00112233445566" following the identification symbol ]] as the musical tone information indicated by pairs of two numerals (0, 0), (1, 1), (2, 2), (3, 3), (4, 4), (5, 5), and (6, 6). The musical tone information is recognized as a matrix combination (X, Y) formed by the tone name information (X) and the musical note information (Y). The musical tone information (0, 0) corresponds to the musical tone memorized at the zeroth address of the X rows and the zeroth address of the Y columns in the scale map ROM, namely, the sixteenth note of the low tone name (do). In the similar manner, (1, 1), (2, 2), (3, 3), (4, 4), (5, 5), and (6, 6) correspond to the eighth note of the tone name (re), the dotted eighth note of the tone name (mi), the quarter note of the tone name (fa), the quarter note tied with the sixteenth note of the tone name (sol), the dotted quarter note of the tone name (la), and the double-dotted quarter note of the tone name (si), respectively.

The radio signal received by the paging receiver may be a signal other than the POCSAG signal. Likewise, the message information for the melody announcement may be characters and symbols comprising seven, eight, or more bits. It will be understood that, in these modifications, the CPU 5 is required to operate in conformity with the signal format of the radio signal.

Figure 6:
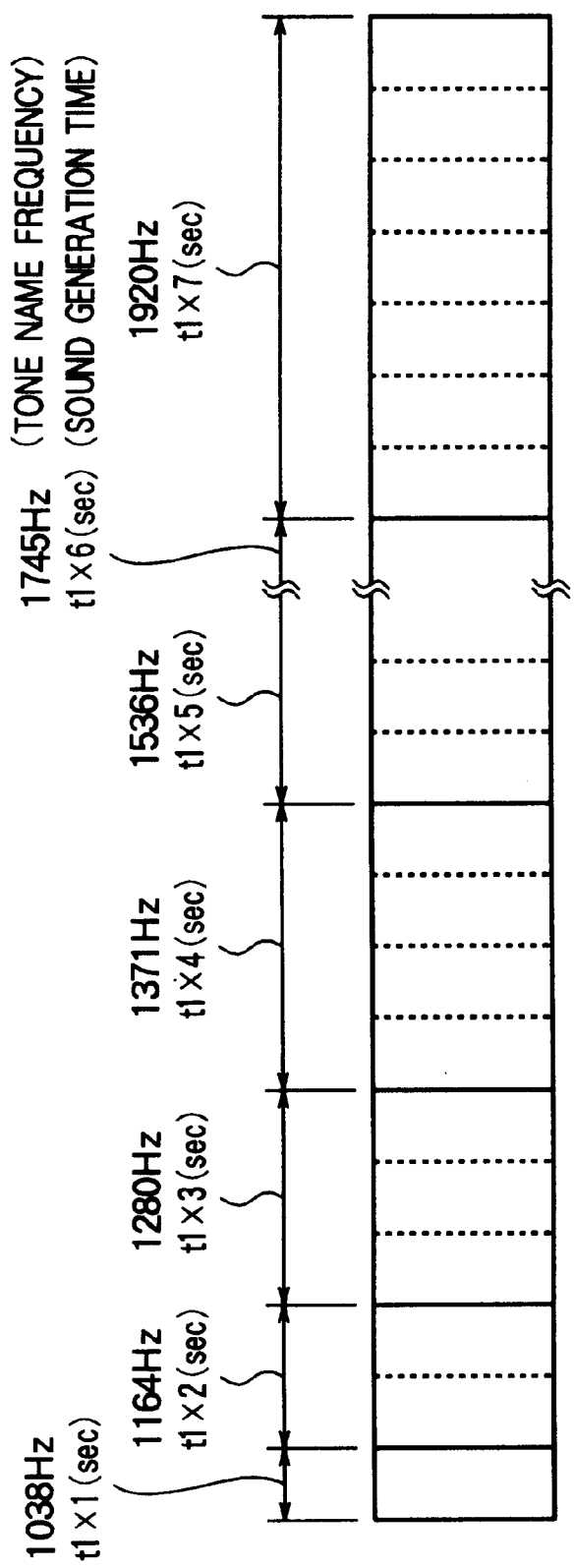
FIG. 6 is a time chart of a melody signal produced by a musical tone signal producing circuit of the radio paging receiver illustrated in FIG. 2.

FIG. 6 shows the melody signal produced in response to the message information of FIG. 5.

Upon recognition of the identification symbol "]]"at the first-half word of the first data frame, the CPU 5 decomposes subsequent numeral data "00112233445566" into pairs of two numerals, each pair corresponding to the musical tone information comprising the tone name and the musical note. With reference to the scale map ROM 7, the musical tone information is time-sequentially developed. The musical tone information thus developed are stored in the musical tone pattern buffer 53. FIG. 6 shows the melody signal produced by the musical tone signal producing circuit 9 in response to the musical tone information which the CPU 5 reads from the musical tone pattern buffer 53.

The musical tone information included in the numeral data "00112233445566" is representative of a melody such that musical tones are produced in the order of the sixteenth note of the low tone name (do), the eighth note of the tone name (re), the dotted eighth note of the tone name (mi), the quarter note of the tone name (fa), the quarter note tied with the sixteenth note of the tone name (sol), the dotted quarter note of the tone name (la), and the double-dotted quarter note of the tone name (si). Accordingly, the musical tone signal producing circuit 9 successively develops the above-mentioned musical tone information into the melody signal indicative of production of the low tone name (do) of the tone name frequency 1038 Hz for t1×1 seconds, the tone name (re) of the tone name frequency 1164 Hz for t1×2 seconds, . . . , and the tone name (si) of the tone name frequency 1920 Hz for t1×7 seconds, and delivers the melody signal to the sound amplification circuit 10.

Figure 7:
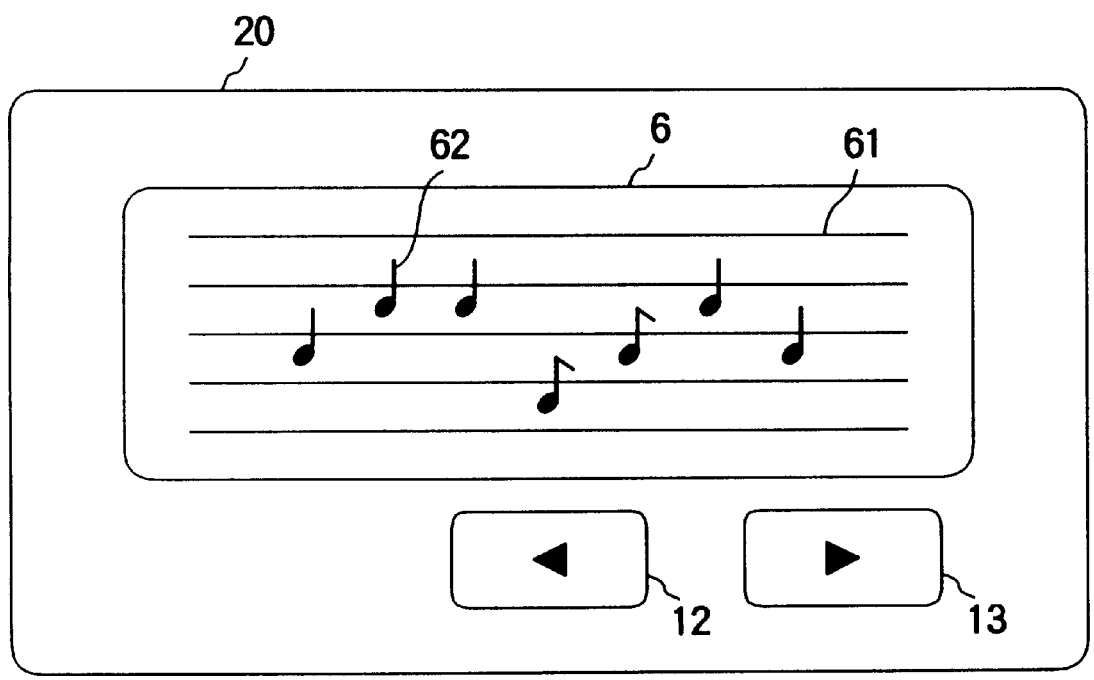
FIG. 7 is a view for exemplify a visual display of melody data on a display section of the radio paging receiver illustrated in FIG. 2.

FIG. 7 shows an example of display in the display section 6 of the melody data obtained in the CPU 5 by developing the musical tone information.

In the paging receiver of this embodiment, the display section 6 is arranged on the surface of a housing 20 together with the readout switch 12 and the registration switch 13. When the CPU 5 recognizes the identification symbol ]] in the message information which has been received, a staff 61 is at first displayed in the display section. Next, the CPU 5 displays, as musical notes 62 put on the staff 61, the developed musical note information developed from the musical tone information in the order of development. Thus, the melody data are displayed.

Figure 8:
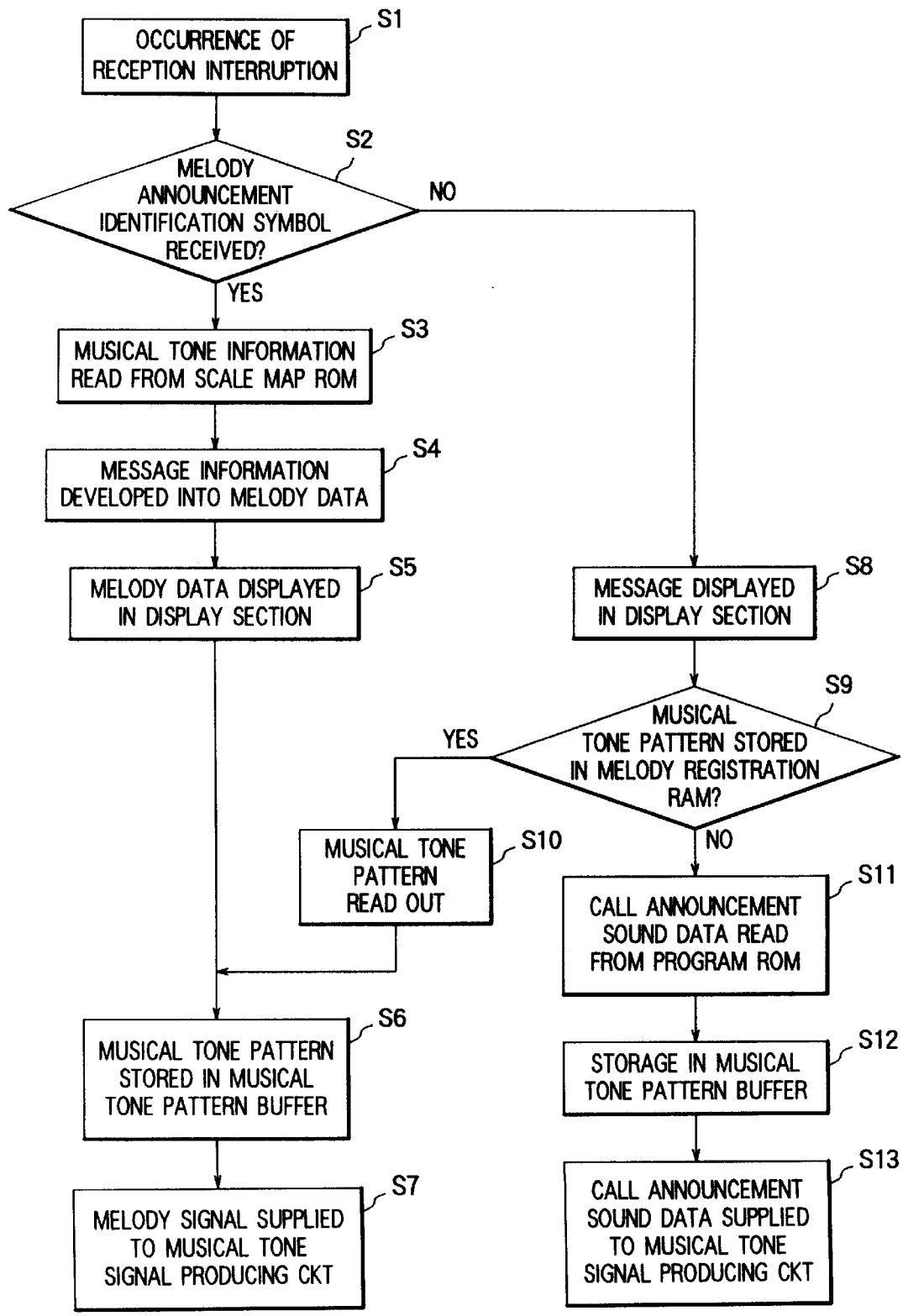
FIG. 8 is a flow chart for use in describing sound generating and displaying operations of the radio paging receiver illustrated in FIG. 2.

FIG. 8 shows sound generating and displaying operations when the CPU 5 in FIG. 2 receives the message information.

After recognition of a specific ID assigned to the receiver, the decoder circuit 3 delivers the message information to the CPU 5 to cause a reception interruption in the CPU 5 (step S1). In this event, the CPU 5 judges whether or not the identification symbol ]] for the melody announcement is present in the message information (step S2). Upon judging the presence of the identification symbol ]] (YES in step S2), the CPU 5 reads the musical tone information preliminarily stored in the scale map ROM 7 (step S3). Subsequently, the CPU 5 converts the message information following the identification symbol ]] into the musical tone information successively corresponding thereto to produce the melody data as time-sequentially developed musical tone information (step S4). The CPU 5 makes the display section 6 display the melody data comprising the tone name information and the musical note information (step S5). For the melody announcement, the CPU 5 converts the tone name information and the musical note information of the melody data into the tone name frequency information and the sound generation time information, respectively, to produce the musical tone pattern which are stored in the musical tone pattern buffer 53 (step S6). The CPU 5 makes the musical tone pattern be supplied from the buffer 53 to the musical tone signal producing circuit 9 so that the loudspeaker 11 plays the melody (step S7).

On the other hand, when the identification symbol ]] is not received in the step S2 (NO in step S2), the CPU 5 makes the display section 6 display the message in the manner similar to the conventional receiver (step S8). When the musical tone pattern is stored in the melody registration RAM 8 (YES in step S9), the CPU 5 reads the musical tone pattern from the melody registration RAM 8 (step S10) and stores it in the musical tone pattern buffer 53 (step S6). Thereafter, in the manner similar to reception of the musical tone information, the loudspeaker 11 plays the melody having the musical tone pattern stored in the melody registration RAM (step S7).

When the musical tone pattern is not stored in the melody registration RAM 8 in the step S9 (NO in step S9), the CPU 5 reads call announcement sound data memorized in the program ROM 51 (step S11) and stores the call announcement sound data in the musical tone pattern buffer 53 (step S12). Thereafter, in the manner similar to the above-mentioned two flows, the CPU 5 makes the loudspeaker 11 produce a call sound corresponding to the call announcement sound data (step S13).

Figure 9:
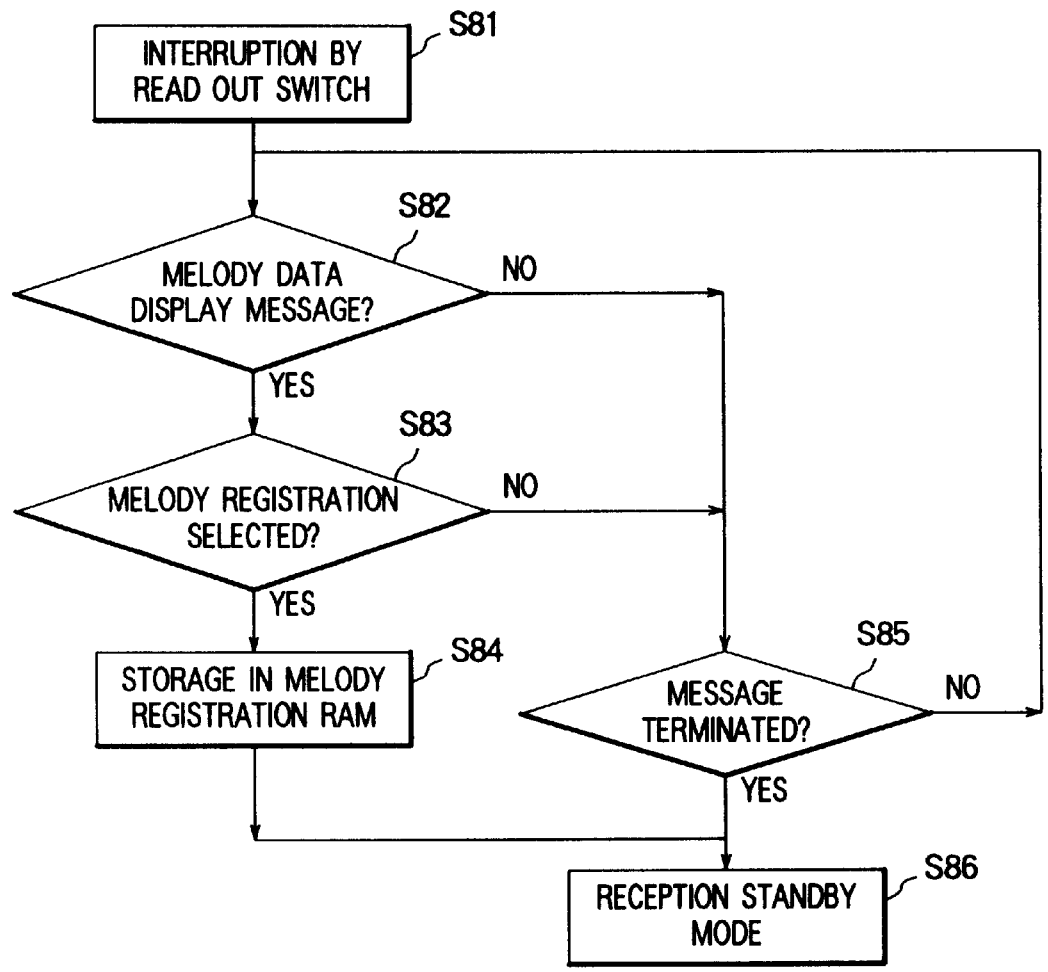
FIG. 9 is a flow chart for use in describing a registering operation of registering a musical tone pattern in a melody registration RAM of the radio paging receiver illustrated in FIG. 2.

FIG. 9 shows an operation of registering the musical tone pattern in the melody registration RAM 8 in FIG. 2.

In occurrence of an interruption by manipulation of the readout switch 12 (step S81), the CPU 5 judges whether or not this interruption is a message requesting the display of the melody data (see FIG. 7) (step S82). When the interruption is the message requesting the display of the melody data (YES in step S82), the CPU 5 turns the operation to a selection mode for melody registration (step S83). When the registration switch 13 is manipulated in this state to select a melody registration mode (YES in step S83), the CPU 5 makes the melody registration RAM 8 store the musical tone pattern stored in the musical tone pattern 53 (step S84). Then, the operation proceeds to a reception standby mode (step S86). In case of NO in the steps 82 and 83, the CPU 5 turns the operation to a judging mode of judging whether or not a next message is present (step S85). When the message is terminated in the step S85 (YES in step S85), the CPU 5 puts the paging receiver into the reception standby mode (step S86). When the next message is read in the step S85, the operation turns back to the step S82.

Summarizing in FIGS. 2 and 3, the radio paging receiver carries out a call announcement for announcing reception of a call by a melody sound. The radio paging receiver comprises a musical tone information memory (7) for preliminarily memorizing a plurality of musical tone information data representing tone names of a plurality of musical tones and tone name frequencies of the tone names of the plurality of musical tones, respectively, and for preliminarily memorizing a plurality of musical note information data representing a plurality of musical notes and time values of the plurality of musical notes, respectively.

A processing part (1-3) is supplied with an electromagnetic wave carrying a specifying signal which specifies a sequence of information pairs, each information pair comprising one of the plurality of musical tone information data and one of the plurality of musical note information data. The processing part processes the electromagnetic wave into the specifying signal.

Connected to the musical tone information memory and the processing part, a producing part (5) produces a musical tone pattern signal comprising a sequence of frequency-time value pairs by reading, from the musical tone information memorizing part, each frequency-time value pair comprising one of the tone name frequencies and one of the time values in response to each information pair specified by the specifying signal. The musical tone pattern signal is for use in deciding the melody sound on generation of the melody sound.

The electromagnetic wave carrying the specifying signal is a radio signal carrying the specifying signal. The processing part is a radio signal processing part (1-3) for processing the radio signal into the the specifying signal.

The radio signal further carries a specific call number specific to the apparatus and an identification symbol which succeeds the specific call number and precedes the specifying signal and which represents that the specifying signal succeeds the identification symbol. The radio signal processing part processes the radio signal into the identification symbol and the specifying signal when the radio signal processing part detects the specific call number in the radio signal. The producing part (5) produces the musical tone pattern signal when the producing part detects the identification symbol.

The radio paging receiver further comprises a sound generating unit (11) and a control part (9, 10) connected to the producing part for controlling the sound generating unit to make the sound generating unit generate the melody sound decided by the musical tone pattern signal.

The producing part is furthermore for producing melody data comprising a sequence of name-note pairs by reading, from the musical tone information memory, each name-note pair comprising one of the tone names and one of the plurality of musical notes in response to each information pair specified by the specifying signal.

The radio paging receiver further comprises a visual display section (6) connected to the producing part for visually displaying the melody data.

The radio paging receiver further comprises a registering part (8) connected to the producing part for registering the musical tone pattern signal.

The radio signal processing part processes, in response to an ordinary radio signal received after the radio signal and carrying the specific call number and message information which succeeds the specific call number and which represents a message, the ordinary radio signal into the message information when the radio signal processing part detects the specific call number in the ordinary radio signal. The producing part produces the message in response to the message information and produces a read-out musical tone pattern signal by reading the musical tone pattern signal out of the registering part as the read-out musical tone pattern signal. The visual display section visually displays the message. The control part controls the sound generating unit to make the sound generating unit generate the melody sound decided by the read-out musical tone pattern signal.

Figure 10:
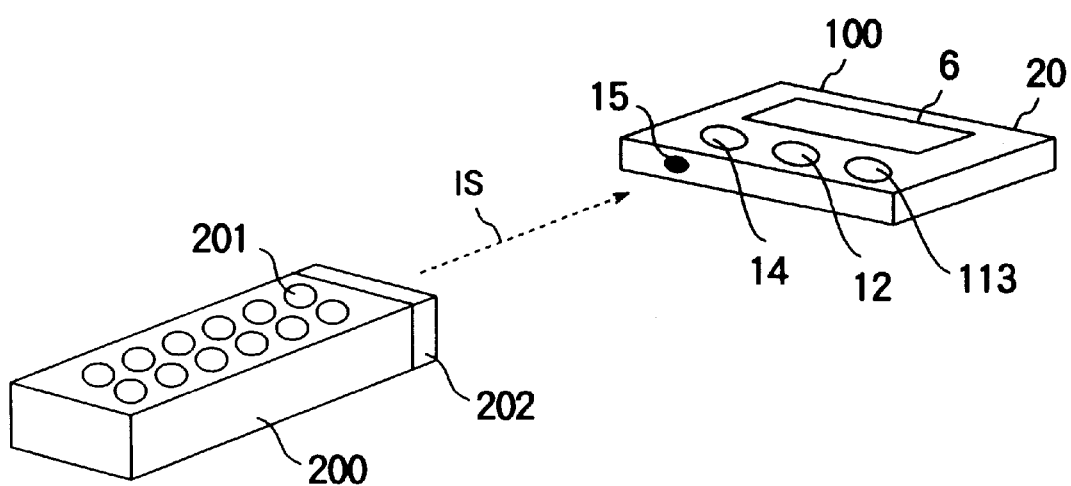
FIG. 10 is a view of a system comprising a radio paging receiver according to a second embodiment of this invention and an infrared remote controller for use in deciding, by an infrared signal, a melody sound generated in the radio paging receiver.

Turning to FIG. 10, a system is illustrated which comprises a radio paging receiver 100 according to a second embodiment of this invention and an infrared remote controller 200 for use in deciding, by an infrared signal IS, a melody sound generated in the radio paging receiver 100.

The infrared remote controller 200 can be implemented by a device commercially available as a television or a stereo remote controller. The infrared remote controller 200 has a plurality of key switches 201 arranged on its principal surface for television control such as a channel switching operation, and an infrared emitting section 202 formed on its end surface for emitting the infrared signal IS by manipulating the key switches 201. The infrared signal IS is modulated by a different code signal corresponding to each manipulated one of the key switches 201. In other words, the infrared signal IS carries the code signal. The code signal comprises a plurality of bits. If the number of bits is equal to four for example, sixteen kinds of different control operations can be carried out.

The radio paging receiver 100 has a display section 6 for displaying various messages, a readout switch 12 to be manipulated upon reading a received message, an optical interface mode switch (optical I/F mode switch) 113, and a remote controller registration switch 14 all of which are formed on a principal surface of a housing 20 having a generally rectangular shape. The radio paging receiver 100 further has an optical interface receiving section (optical I/F receiving section) 15 formed on its side surface for receiving the infrared signal IS to demodulate it into the code signal.

The optical I/F mode switch 113 is used in switching a remote controller registration mode and a melody registration mode. In the remote controller registration mode, key switch information (produced by processing the above-mentioned code signal in predetermined steps) corresponding to each key switch 201 of the infrared remote controller 200 is memorized in the paging receiver 100 in correspondence to musical tone information. In the melody registration mode, data of a melody (melody data) are registered in the paging receiver 100 by the use of the infrared signal IS from the infrared remote controller 200. The remote controller registration switch 14 is for allocation of the above-mentioned key switch information to the musical tone information and for settlement of the above-mentioned melody registration.

Figure 11:
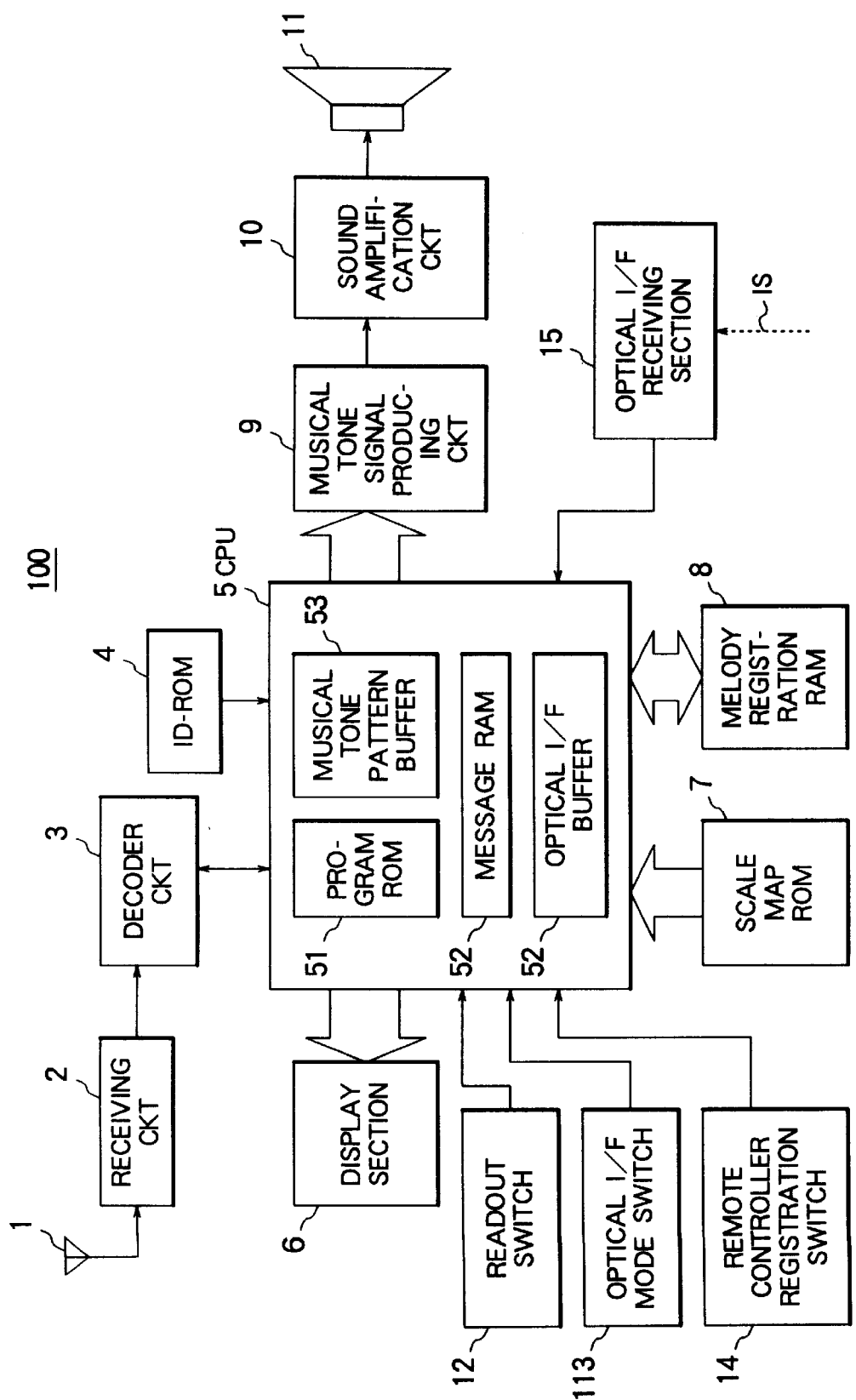
FIG. 11 is a block diagram of the radio paging receiver illustrated in FIG. 10.

Turning to FIG. 11, the radio paging receiver 100 comprises similar parts designated by like reference numerals.

Referring to FIGS. 1 and 2, description will be made as regards registration of the infrared remote controller 200 as well as registration of the melody.

At first, description is directed to the registration of the infrared remote controller 200, namely, an operation of allocating those code signals produced by manipulating the key switches 201 to a plurality of musical tone information in the scale map ROM 7 of the radio paging receiver 100, respectively.

Upon this allocation, a user at first manipulates the optical I/F mode switch 113 to select the "remote controller registration mode". When the key switches 201 are manipulated in this mode, the optical I/F receiving section 15 receives the infrared signal IS and demodulates it into the code signals. A CPU 5 converts each code signal into the key switch information corresponding to a labelled name of each key switch 201 through predetermined operation steps. For example, if the labelled name of a particular one of the key switches 201 is a numeral, the CPU 5 converts the code signal into the key switch information indicative of the numeral on the corresponding key switch 201. The CPU 5 allocates the key switch information obtained by conversion of the code signals to a plurality of the musical tone information memorized in the scale map ROM 7 and temporarily stores the same in an optical interface (optical I/F) buffer 54.

The key switch information also includes an identification symbol (may be referred to as a shift-in code) for the melody registration and another identification symbol (may be referred to as a shift-out code) representative of completion of the melody registration. The paging receiver 100 of this embodiment uses a symbol * (asterisk) as the shift-in code and another symbol ** as the shift-out code. Those identification symbols may be numerals, characters, or other symbols.

Subsequently, when the remote controller registration switch 14 is manipulated, the CPU 5 settles the key switch information stored in the optical I/F buffer 54 in correspondence to the musical tone information and stores the key switch information in a remote controller registration area in a melody registration RAM 8. The melody registration RAM 8 may be replaced by an erasable/programmable EEPROM. The CPU 5 makes the display section 6 display the key switch information settled in correspondence to the musical tone information by the use of the labelled names of the key switches 201, for example, the numerals together with the musical tone information.

It is assumed here that the scale map ROM 7 stores 49 the musical tone information in X=7 rows and Y=7 columns, as described in FIG. 3 and 4. In this event, the code signal must have 6 bits or more. Alternatively, two code signals of 3 bits or more are combined to form matrix information. Specifically, if the code signal has 3 bits, the key switches 201 are manipulated twice and then the remote controller registration switch 14 is manipulated. In the paging receiver 100 of this embodiment, the musical tone information comprising the tone name information of one octave from a low tone name (do) to a high tone name (do) and the musical note information from a sixteenth note to a half note is represented by the matrix information given by two numerals. Specifically, a first code signal indicates the address of the tone name information while a second code signal indicates the address of the musical note information. The tone name information is represented by numerals 0 through 7 successively allocated in the order from a lower tone. The musical note information is represented by numerals 0 through 7 successively allocated in the order from a shorter note. In case where the musical tone information is stored in the scale map ROM 7 in the manner mentioned above, the CPU 5 can establish proper correspondence between the key switch information and the musical tone information when the user manipulates the key switches 201 of the infrared remote controller 200 successively from the numerals 0 to 7 in the remote controller registration.

Next, the melody (melody data) registration is carried out following the registration of the infrared remote controller 200. For the melody registration, the optical I/F mode switch 113 is manipulated to select the "melody registration mode". In this mode, the user at first manipulates a particular one of the key switches 201 which represents the shift-in code *. When the symbol * is recognized in the key switch information corresponding to a particular code signal from the optical I/F receiving section 15, the CPU 5 recognizes that those code signals subsequently supplied are indicative of the musical tone information forming the melody. The CPU 5 makes the optical I/F buffer 54 temporarily store the key switch information obtained by conversion of the respective code signals. Upon completion of transmission of the code signals indicating the respective musical tones of the melody, the user inputs through one of the key switches 201 the shift-out code  indicative of completion of the transmission of the code signals indicating the musical tones. By recognition of the symbol , the CPU 5 recognizes completion of the input of the code signals for the melody registration.

With reference to the musical tone information stored in the scale map ROM 7, the CPU 5 time-sequentially develops the key switch information related to the melody and stored in the optical I/F buffer 54 to prepare the melody data as time-sequentially developed musical tone information. Subsequently, when the remote controller registration switch 14 is manipulated by the user, the CPU 5 makes the melody data be stored/settled in a melody data area in the melody registration RAM 8. In addition, the above-mentioned melody data are displayed in the display section 6.

In this event, the CPU 5 may make the loudspeaker 11 generate a melody sound decided by a musical tone pattern signal into which the CPU 5 processes the melody data in the following manner. The CPU 5 may make the musical tone pattern signal be stored/settled in the melody registration RAM 8 instead of the melody data. By the above-described operation, the melody registration in the radio paging receiver 100 by the use of the infrared remote controller 200 is completed.

When the radio paging receiver 100 receives a call in the state where the melody data are memorized in the melody registration RAM 8, the CPU 5 reads the melody data from the melody registration RAM 8. The CPU 5 converts the tone name information and the musical note information of the melody data into tone name frequency information and sound generation time information, respectively, and makes a musical tone pattern buffer 53 store such information as a musical tone pattern. The CPU 5 delivers to a musical tone signal producing circuit 9 the musical tone pattern stored in the musical tone pattern buffer 53. The musical tone signal producing circuit 9 converts the musical tone pattern into a musical tone signal representative of the tone name frequencies and the sound generation times successively corresponding to the musical tones, in other words, produces a melody signal. The sound amplification circuit 10 amplifies the melody signal and the loudspeaker 11 generates a melody sound corresponding to the melody signal. On the other hand, when the paging receiver 100 receives a call in the state where no melody data are memorized in the melody registration RAM 8, the CPU 5 delivers to the musical tone signal producing circuit 9 beep sound data memorized in a program ROM 51 and makes, via the sound amplification circuit 10, the loudspeaker 11 produce a beep sound, in the manner similar to the conventional receiver.

In the radio paging receiver 100 also, the program ROM 51 further stores a program for operating the CPU 5, like in the conventional receiver. Message information having been received is memorized in a message RAM 52 in the CPU 5. When the CPU 5 is subjected to a message display interruption by manipulation of the readout switch 12, the CPU 5 successively retrieves those messages from the message RAM 52 for display in the display section 6.

As described above, the paging receiver according to the second embodiment of this invention can use, for call announcement, the melody prepared from the code signals produced by manipulation of the key switches 201 of the infrared remote controller 200. Therefore, the call announcement can be carried out by the melody produced in conformity with the taste of each of a large number of users.

More specifically, upon recognition of the symbol * in the code signal which is received from the optical I/F receiving section 15 when the key switch information corresponding to the musical tone information is already memorized in the melody registration RAM 8, the CPU 5 decomposes subsequent numeral data, for example, "00112233445566" into pairs of two numerals corresponding to the musical tone information comprising the tone name and the musical note. With reference to the scale map ROM 7, the CPU 5 time-sequentially develops the key switch information comprising those pairs of two numerals (0, 0), (1, 1), (2, 2), (3, 3), (4, 4), (5, 5), and (6, 6) into the musical tone information. The pattern of the musical tone information thus developed are stored in the musical tone pattern buffer 53. The melody signal is produced by the musical tone signal producing circuit 9 in response to the musical tone information which the CPU 5 reads from the musical tone pattern buffer 53. The melody signal is shown in FIG. 6.

Figure 12:
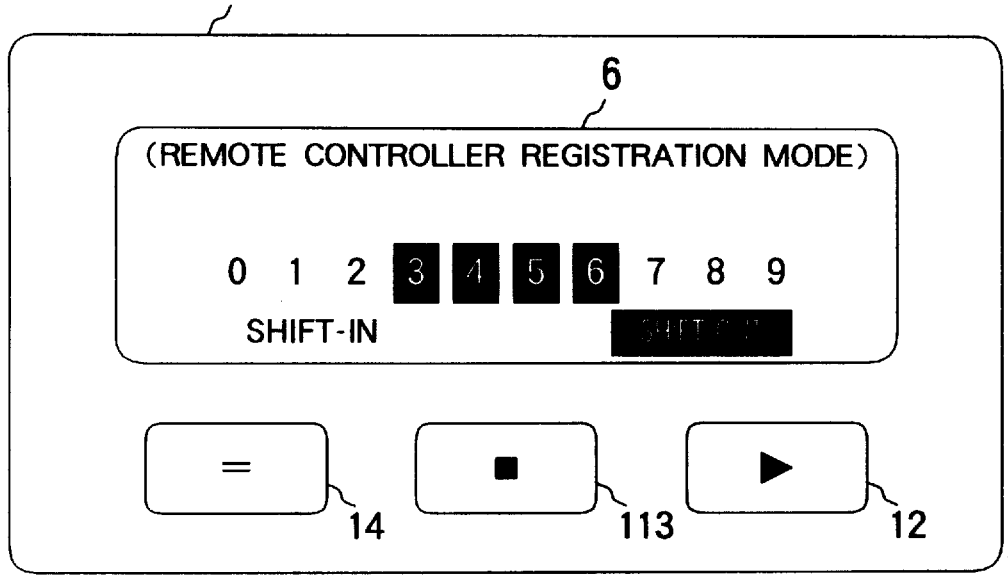
FIG. 12 is a view for exemplify a visual display on a display section of the radio paging receiver of FIG. 11 in a remote controller registration mode.

FIG. 12 shows a scene of the display section 6 in the remote controller registration mode for registration of the infrared remote controller 200.

The code signals produced by manipulating the key switches 201 of the infrared remote controller are different in individual remote controllers generally available. Accordingly, the paging receiver 100 is required to memorize the code signal produced by manipulation of each key switch 201 of a particular infrared remote controller which is to be used. The scene in FIG. 12 is a remote controller registration mode scene which is displayed when the user manipulates the optical I/F mode switch 113 to select the "remote controller registration mode". This mode scene is for use in registering, in the melody registration RAM 8, the key switch information obtained by the CPU 5 as a result of conversion of the code signals produced by manipulating numeral keys of the key switches 201. The key switch information includes the identification symbol (shift-in code) representative of activation of input of the code signals from the optical I/F receiving section 15, the key switch information corresponding to the musical tone information, and an inactivation symbol (shift-out code) representative of inactivation of reception of the code signals from the optical I/F receiving section 15. The key switch information indicated by numerals and symbols as already registered, herein, the numeral pairs (3, 4) and (5, 6) representative of the musical tone information and the symbols (shift-out) indicative of the end of the remote controller registration are displayed in the form of black-painted characters (reversed characters). By manipulating the remote controller registration switch 14, the paging receiver 100 quits from the remote controller registration mode to be turned into a reception standby mode.

Figure 13:
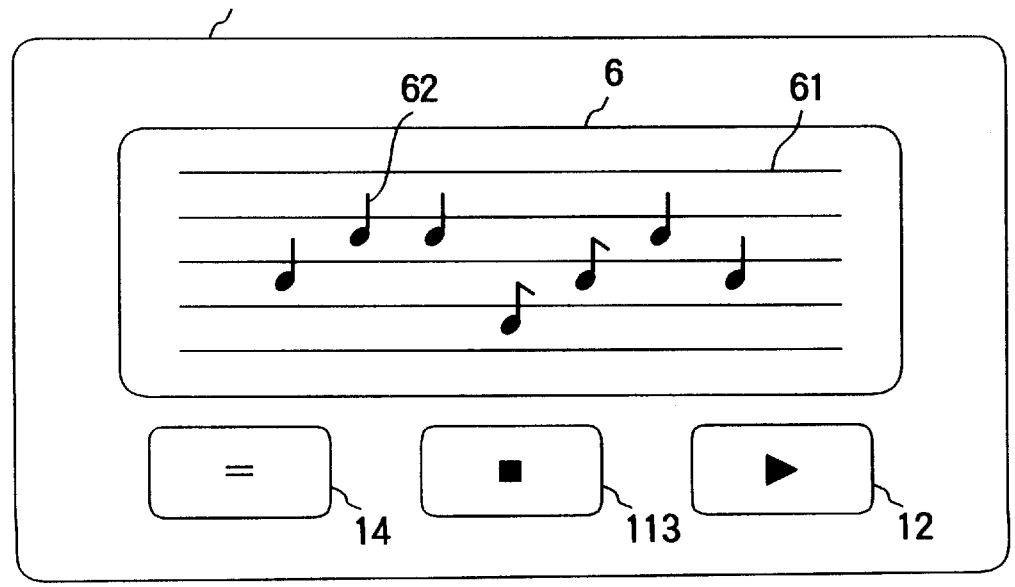
FIG. 13 is a view for exemplify a visual display of melody data on a display section of the radio paging receiver illustrated in FIG. 11.

FIG. 13 shows an example of display in the display section 6 of the melody data obtained in the CPU 5 by developing the musical tone information.

In the paging receiver 100 of this embodiment, the display section 6 is arranged on the principal surface of the housing 20 together with the readout switch 12 and the remote controller registration switch 14. After completion of preparation of the melody data and registration of the same in the melody registration RAM 8, the CPU 5 time-sequentially develops the melody data for display as musical notes 62 put on a staff 61 in the display section 6.

Figure 14:
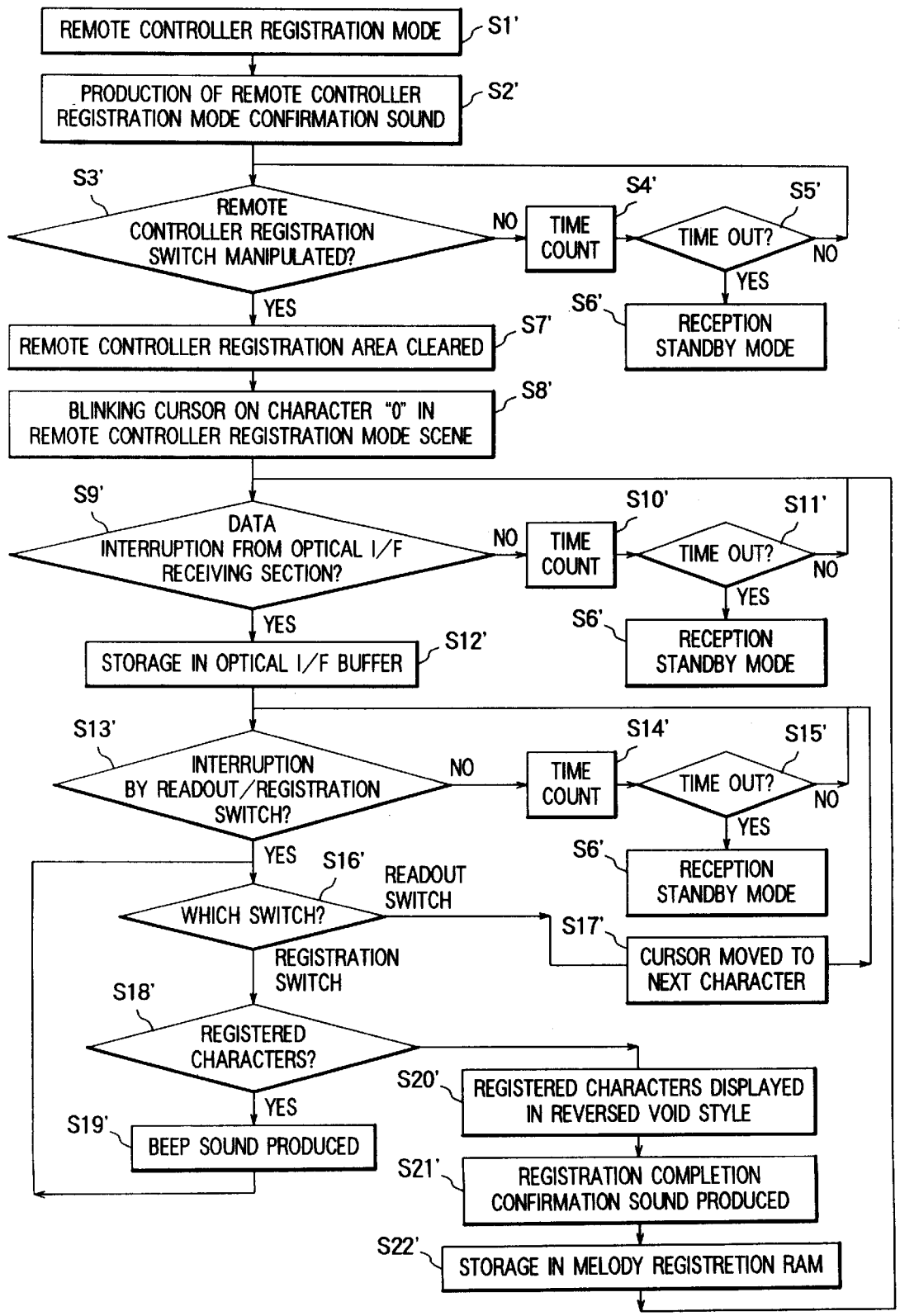
FIG. 14 is a flow chart for use in describing a preliminary operation of registering key switch information of the infrared remote controller 200 in a melody registration RAM of the radio paging receiver illustrated in FIG. 11.

FIG. 14 is a flow chart for describing a preliminary operation of registering the key switch information of the infrared remote controller 200 in the melody registration RAM 8 in FIG. 11.

In order to register the code signal of each key of the key switches 201 of the infrared remote controller 200 as the key switch information, the user manipulates the optical I/F mode switch 113 to turn the paging receiver 100 into the remote controller registration mode (step S1'). At the time instant when this mode is started, the CPU 5 makes, through the musical tone signal producing circuit 9 and the sound amplification circuit 10, the loudspeaker 11 generate a confirmation sound representative of the start of the remote controller registration mode (step S2'). Then, the CPU 5 monitors an interruption signal by the remote controller registration switch 14 (steps S3' through S5'). The CPU 5 makes an internal time counter count a WAIT time period (predetermined time period of a desired length) for manipulation of the switch 14 (step S4'). In case of time-out (YES in step S5'), the receiver is turned back into the reception standby mode (step S6'). When the interruption signal is received by manipulation of the remote controller registration switch 14 (YES in step S3') within the WAIT time period, the CPU 5 clears a remote controller registration area in the melody registration RAM 8 (step S7'). Simultaneously, the display scene of the display section 6 is turned into the remote controller registration mode scene as illustrated in FIG. 12. At this time, a blinking cursor is positioned on a character "0" in the display scene (step S8').

In the step S9', the CPU 5 monitors a data interruption from the optical I/F receiving section 15, namely, reception of the code signals (steps S9' through S11'). The time counter of the CPU 5 counts a WAIT time period for the data interruption (step S10'). In case of time-out (YES in step S11'), the receiver returns to the reception standby mode (step S6'). Upon occurrence of the data interruption within the WAIT time period (YES in step S9'), the CPU 5 converts the code signals from the optical I/F receiving section 15 into the key switch information to be temporarily stored in the optical I/F buffer 54 (step S12'). Then, the CPU 5 monitors a switch interruption by manipulation of the readout switch 113 or the remote controller registration switch 14 (steps S13' through S15'). The time counter counts a WAIT time period for the switch interruption (step S14'). In case of time-out (YES in step S15'), the CPU 5 turns the paging receiver 100 back into the reception standby mode (step S6').

When the readout switch 113 or the remote controller registration switch 14 is manipulated within the WAIT time period in the steps 13 through 15 (YES in step S13'), the CPU 5 judges which switch is involved in the interruption (step S16'). In case of the interruption by the readout switch 12 (READOUT SWITCH in step S16'), the CPU 5 moves the blinking cursor in the display scene of the display section 6 in the order of "0→1→2→3→4→5→6→7→8→9→shift-in→shift-out" (step S17'). Then, the operation is returned back to the step S13'. On the other hand, in case where the switch interruption is caused by the remote controller registration switch 14 (REGISTRATION SWITCH in the step S16'), the CPU 5 judges whether or not interrupting data in the step S9' correspond to the key switch information already registered (step S18'). If it is judged that the interrupting data (code signals) are already registered as the key switch information (already registered in reversed void numerals in FIG. 12) (YES in step S18'), the CPU 5 makes the loudspeaker 11 produce the beep sound (step S19'). Then, operation is returned to the step S16' to make the user select another one of the key switches 201.

When judgement is made in the step S18' that the interrupting data are unregistered key switch information (not yet registered in the reversed void numerals in FIG. 12) (NO in step S18'), the CPU 5 switches those characters displayed on the display section 6 which correspond to the above-mentioned key switch information into a reversed void indication (see FIG. 12) (step S20'), and makes the confirmation sound representative of completion of registration of the key switch information be generated (step S21'). The key switch information corresponding to interrupting code signals are stored in the remote controller registration area in the melody registration RAM 8 (step S22'). Thereafter, the CPU 5 returns the flow to the step S9' to wait reception of another code signal for the remote controller registration as a result of transmission of a next infrared signal IS from the infrared remote controller 200.

Figure 15:
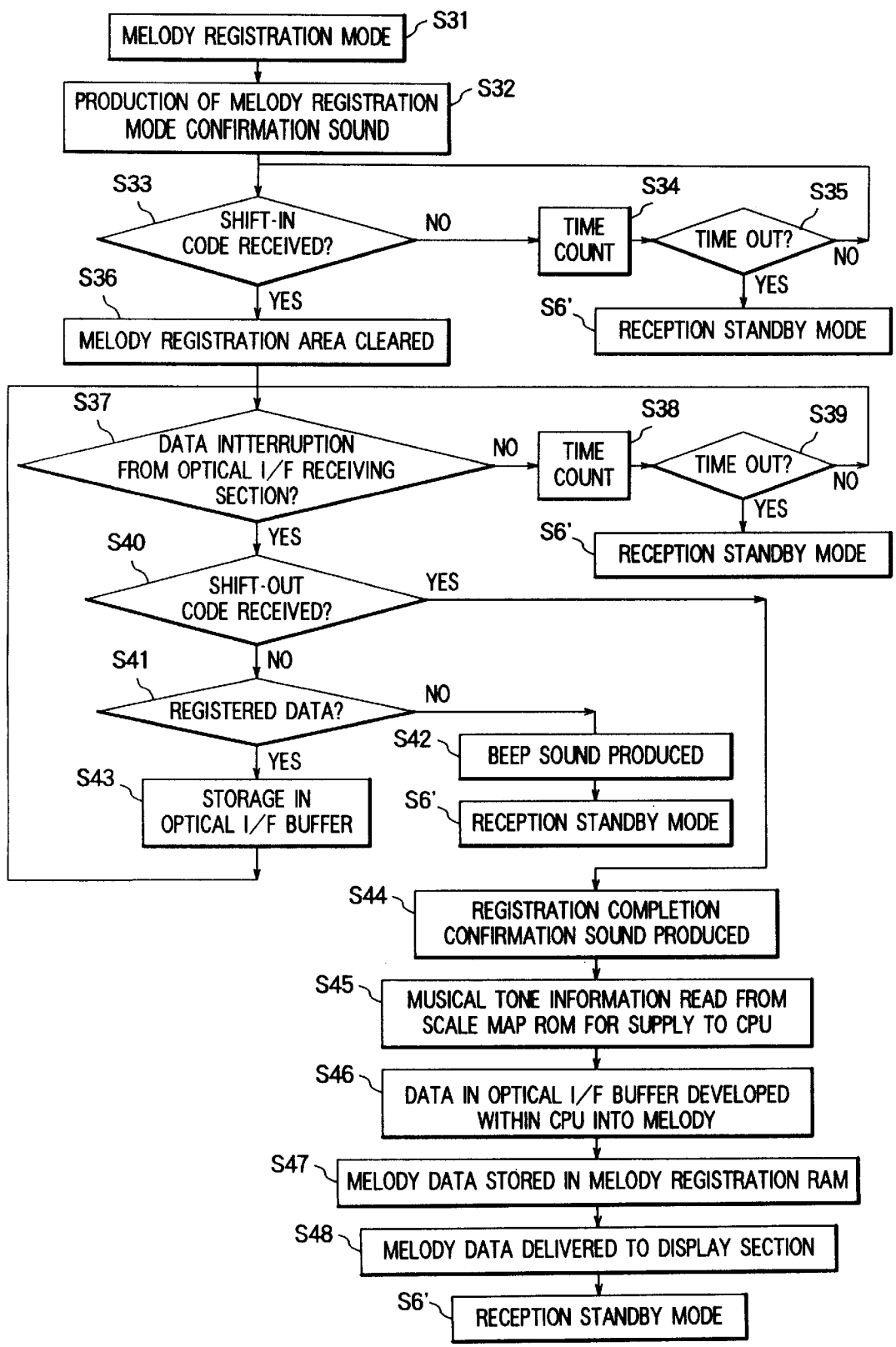
FIG. 15 is a flow chart for use in describing a registering operation of registering melody data in a melody registration RAM of the radio paging receiver illustrated in FIG. 11.

FIG. 15 is a flow chart for describing an operation of registering the melody in the melody registration RAM 8 in FIG. 11.

In order to register the melody in the paging receiver 100 by the use of the infrared remote controller 200, the user at first manipulates the optical I/F mode switch 14 to turn the receiver into the melody registration mode under control of the CPU 5 (step S31). At the time instant when this mode is started, the CPU 5 makes the loudspeaker 11 produce a confirmation sound representative of the start of the melody registration mode (step S32). Then, the CPU 5 monitors, among the code signals produced by manipulation of the key switches 201 of the infrared remote controller 200 and supplied from the optical I/F receiving section 15, an interruption by and recognition of the shift-in code * (steps S33 through S35). The time counter in the CPU 5 counts a WAIT time period (step S34). In case of time-out (YES in step S35), the operation returns to the reception standby mode (step S6').

If the code signal is received within the WAIT time period, the CPU 5 judges whether or not the key switch information obtained by conversion of the code signal is coincident with the shift-in code * registered in the remote controller data registration area of the melody registration RAM 8 (step S33). Upon coincidence therebetween (YES in step S33), the CPU 5 clears the melody registration area in the melody registration RAM 8 (step S36). Subsequently, the CPU 5 monitors another data interruption (reception of another code signal) from the optical I/F receiving section 15 (steps S37 through S39). The time counter counts a WAIT time period for the data interruption (step S38). In case of time-out (YES in step S39), the flow returns to the reception standby mode (step S6').

When the code signal is received within the WAIT time period, the CPU 5 judges whether or not the key switch information corresponding to the code signal is coincident with the shift-out code ** registered in the remote controller data registration area of the melody registration RAM 8 and indicative of completion of the melody registration (step S40). If the key switch information is not the shift-out code (NO in step S40), the CPU 5 confirms that the key switch information is registered in the remote controller data registration RAM area of the melody registration RAM 8 (step S41). If registered (YES in step S41), the CPU 5 makes the optical I/F buffer 54 temporarily store, as one of the melody data, the key switch information corresponding to the code signal which has been received (step S43).

Thereafter, the flow returns to the step S37 to continue storage of another melody data into the optical I/F buffer 54. When judgement is made in the step S41 that the code signal having been received is unregistered (NO in step S41), the CPU 5 makes the beep sound be generated (step S42). Then, the flow returns to the reception standby mode (step S6').

When it is recognized in the step S40 that the code signal having been received is the shift-out code **, the CPU 5 makes the loudspeaker 11 generate the beep sound indicating completion of the melody registration (step S44). The CPU 5 reads the musical tone information from the scale map ROM 7 (step S45). With reference to the musical tone information, a plurality of key switch information in the optical I/F buffer 54 are time-sequentially combined to prepare the melody data as time-sequentially developed musical tone information (step S46). The melody data are stored in the melody registration area of the melody registration RAM 8 (step S47). Simultaneously, the CPU 5 makes the display section 6 display the melody data comprising the tone name information and the musical note information, as illustrated in FIG. 7 (step S48). Thereafter, the CPU 5 returns the flow to the reception standby mode (step S6').

Figure 16:
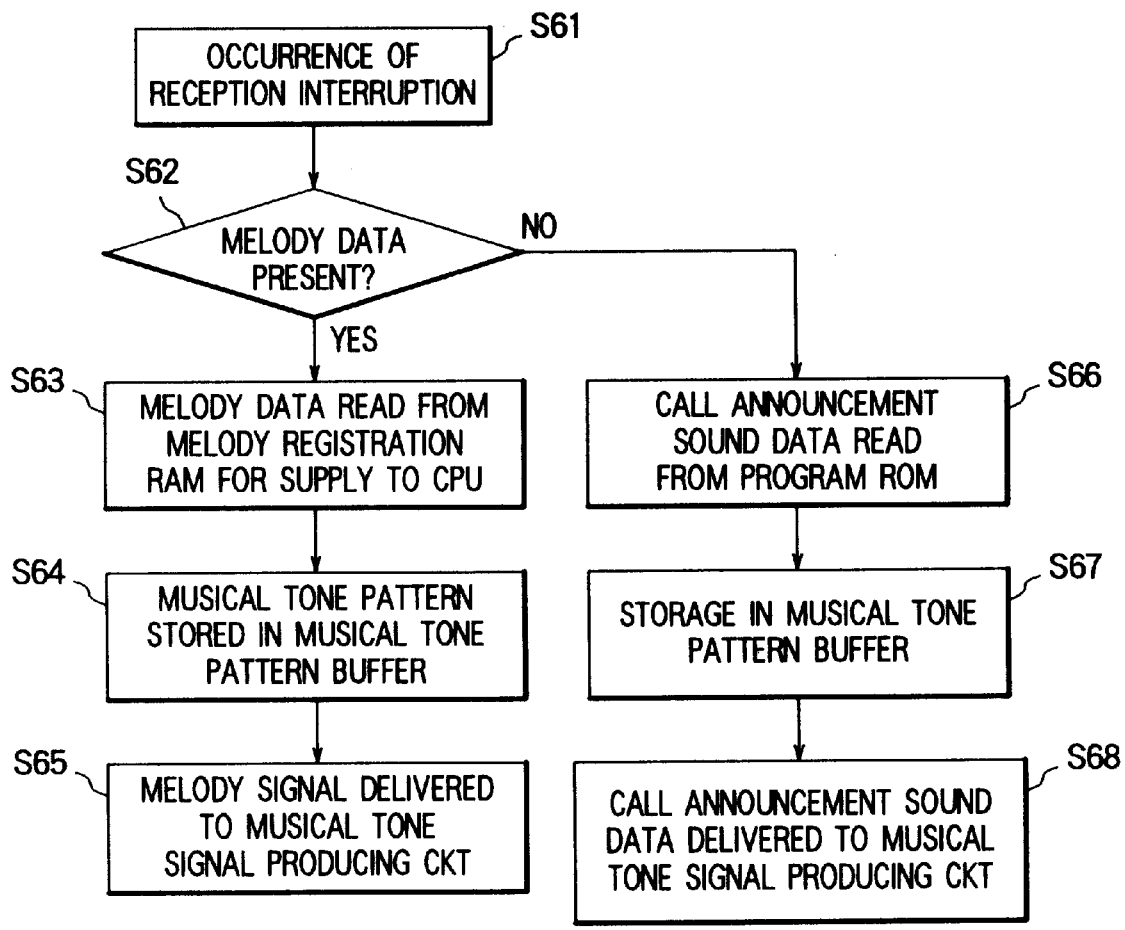
FIG. 16 is a flow chart for use in describing an operation of the radio paging receiver of FIG. 11 when the radio paging receiver receives an ordinary radio signal.

FIG. 16 is a flow chart for describing an operation of the paging receiver 100 upon reception of a call.

After recognition of a specific ID assigned to the receiver, the decoder circuit 3 delivers the message information to the CPU 5 to cause a reception interruption in the CPU 5 (step S61). In this event, the CPU 5 judges whether or not the melody data are registered in the melody registration RAM 8 (step S62). When judgement is made that the melody data are registered (YES in step S62), the CPU 5 reads the melody data from the melody registration RAM 8 (step S63). The melody data are developed into the musical tone pattern which is stored in the musical tone pattern buffer 53 (step S64). The CPU 5 sends to the musical tone signal producing circuit 9 the musical tone pattern stored in the musical tone pattern buffer 53. The musical tone signal producing circuit 9 converts the musical tone pattern into the musical tone signal representative of the tone name frequencies and the sound generation times successively corresponding to the musical tones, namely, produces the melody signal. The melody signal is sent through the sound amplification circuit 10 to the loudspeaker 11 so that the loudspeaker 11 plays the melody (step S65).

On the other hand, when it is judged in the step S62 that the melody data are not registered in the melody registration RAM 8 (NO in step S62), the CPU 5 reads call announcement sound data preliminarily stored in the program ROM 51 (step S66) and makes the call announcement sound data be stored in the musical tone pattern buffer 53 (step S67). Then, the call announcement sound data are supplied to the musical tone signal producing circuit 9 to make the loudspeaker 11 generate the beep sound (step S68).

Summarizing in FIGS. 11 and 3, the radio paging receiver carries out a call announcement for announcing reception of a call by a melody sound. The radio paging receiver comprises a musical tone information memory (7) for preliminarily memorizing a plurality of musical tone information data representing tone names of a plurality of musical tones and tone name frequencies of the tone names of the plurality of musical tones, respectively, and for preliminarily memorizing a plurality of musical note information data representing a plurality of musical notes and time values of the plurality of musical notes, respectively.

A processing part (15) is supplied with an electromagnetic wave carrying a specifying signal which specifies a sequence of information pairs, each information pair comprising one of the plurality of musical tone information data and one of the plurality of musical note information data. The processing part processes the electromagnetic wave into the specifying signal; and Connected to the musical tone information memory and the processing part, a producing part (5) produces a musical tone pattern signal comprising a sequence of frequency-time value pairs by reading, from the musical tone information memory, each frequency-time value pair comprising one of the tone name frequencies and one of the time values in response to each information pair specified by the specifying signal. The musical tone pattern signal is for use in deciding the melody sound on generation of the melody sound.

The electromagnetic wave carrying the specifying signal is an infrared signal carrying the specifying signal. The processing part is an infrared signal processing part (15) for processing the infrared signal into the specifying signal.

The radio paging receiver further comprises a sound generating unit (11) and a control part (9, 10) connected to the producing part for controlling the sound generating unit to make the sound generating unit generate the melody sound decided by the musical tone pattern signal.

The producing part is furthermore for producing melody data comprising a sequence of name-note pairs by reading, from the musical tone information memory, each name-note pair comprising one of the tone names and one of the plurality of musical notes in response to each information pair specified by the specifying signal.

The radio paging receiver further comprises a visual display section (6) connected to the producing part for visually displaying the melody data.

The radio paging receiver further comprises a registering part (8) connected to the producing part for registering the melody data.

The radio paging receiver further comprise a radio signal processing part (1-3) for processing, in response to an ordinary radio signal carrying a specific call number specific to the apparatus and message information which succeeds the specific call number and which represents a message, the ordinary radio signal into the message information when the radio signal processing part detects the specific call number in the ordinary radio signal. The producing part produces the message in response to the message information and produces a read-out musical tone pattern signal by reading the musical tone pattern signal out of the musical tone information memory as the read-out musical tone pattern signal in response to read-out melody data given by reading the melody data out of the registering part as the read-out melody data. The visual display section visually displays the message. The control part controls the sound generating unit to make the sound generating unit generate the melody sound decided by the read-out musical tone pattern signal.

Alternatively, the registering part (8) may registers the musical tone pattern signal instead of the melody data.

In this case, the producing part produces the message in response to the message information and produces a read-out musical tone pattern signal by reading the musical tone pattern signal out of the registering part as the read-out musical tone pattern signal.

What is claimed is:

1. A method for playing a melody for announcing reception of a call signal by a communication apparatus, the method comprising the steps of:

providing the communication apparatus having a user melody stored therein;

receiving the call signal containing a message;

determining if a melody signal is present in the received call signal;

announcing reception of the received call signal by playing a melody corresponding to the melody signal if the melody signal is determined to be present in the received call signal; and announcing reception of the received call signal by playing the user melody if the melody signal is determined not to be present in the received call signal.

2. The method as claimed in claim 1, further comprising the step of composing the user melody by a user of the communication apparatus for storage in the communication apparatus.

3. The method as claimed in claim 1, wherein the melody signal and/or user melody comprises a sequence of name-note pairs each name-note pair comprising one of a tone name and one of a plurality of musical notes, and wherein the method further comprises the step of: visually displaying the melody corresponding to the melody signal or the user melody on a visual display means concurrently with one of the announcing steps.

4. The method as claimed in claim 1, wherein the determining step searches the received call signal for an identification symbol which represents the presence of a melody signal following thereafter.

5. The method as claimed in claim 2, wherein the composing step further comprises registering the composed melody in the memory with a registering means connected to the communication apparatus.

6. The method as claimed in claim 5, wherein the registering means is an infrared device having means for inputting and transmitting a composed melody to the communication apparatus, wherein the composing step comprises:

entering data corresponding to the composed melody;

transmitting the data to the communication device; and receiving the transmitted data at the communication device and storing the transmitted data in the memory.

7. The method as claimed in claim 1, wherein said received call signal is a radio frequency signal.

* * * * *